(12) United States Patent
Hirose et al.

(10) Patent No.: US 9,899,657 B2
(45) Date of Patent: Feb. 20, 2018

(54) CURRENT INTERRUPTION DEVICE AND ELECTRICAL ENERGY STORAGE DEVICE USING THE SAME

(71) Applicants: KABUSHIKI KAISHA TOYOTA JIDOSHOKKI, Kariya-shi, Aichi (JP); EAGLE INDUSTRY CO., LTD., Tokyo (JP)

(72) Inventors: Takayuki Hirose, Kariya (JP); Motoaki Okuda, Kariya (JP); Hiroyasu Nishihara, Kariya (JP); Toshiaki Iwa, Tokyo (JP); Yoshihiro Ogawa, Tokyo (JP); Makoto Mitsuyasu, Tokyo (JP); Norimitsu Akiyoshi, Tokyo (JP)

(73) Assignees: KABUSHIKI KAISHA TOYOTA JIDOSHOKKI, Kariya-shi, Aichi (JP); Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 15/129,723

(22) PCT Filed: Feb. 16, 2015

(86) PCT No.: PCT/JP2015/054168
§ 371 (c)(1),
(2) Date: Sep. 27, 2016

(87) PCT Pub. No.: WO2015/146365
PCT Pub. Date: Oct. 1, 2015

(65) Prior Publication Data
US 2017/0133657 A1 May 11, 2017

(30) Foreign Application Priority Data

Mar. 28, 2014 (JP) .................................. 2014-068971

(51) Int. Cl.
*H01M 2/34* (2006.01)
*H01M 2/12* (2006.01)

(52) U.S. Cl.
CPC .......... *H01M 2/345* (2013.01); *H01M 2/1223* (2013.01); *H01M 2/1229* (2013.01);
(Continued)

(58) Field of Classification Search
CPC .......................... H01M 2/1235; H01M 1/1241
See application file for complete search history.

(56) References Cited

U.S. PATENT DOCUMENTS

| 5,567,539 A | * | 10/1996 | Takahashi | ............ | H01H 37/323 |
| | | | | | 429/57 |
| 5,707,756 A | * | 1/1998 | Inoue | .................. | H01M 2/1235 |
| | | | | | 429/57 |

(Continued)

FOREIGN PATENT DOCUMENTS

| JP | 11-329402 A | 11/1999 |
| JP | 2000-090911 A | 3/2000 |

(Continued)

OTHER PUBLICATIONS

Japanese Notification of Reasons for Refusal issued in JP 2014-068971 dated Apr. 28, 2015.

(Continued)

*Primary Examiner* — Jeremiah Smith
(74) *Attorney, Agent, or Firm* — Sughrue Mion, PLLC (57) ABSTRACT

A current interruption device includes a first conductive member, a second conductive member, a first deformable member, and a second deformable member. The first conductive member is fixed to a casing. The second conductive member is disposed at a position opposed to the first conductive member. The first deformable member is in contact with the second conductive member when pressure in the casing is equal to or less than a predetermined value. Further, the first deformable member is brought out of contact with the second conductive member when the pressure in the casing exceeds the predetermined value. A plastic deformation portion deformed in a manner of projecting toward the second conductive member is provided on a center portion of the second deformable member.

9 Claims, 3 Drawing Sheets

(52) U.S. Cl.
CPC ........ *H01M 2/1235* (2013.01); *H01M 2/1241* (2013.01); *H01M 2/1247* (2013.01); *H01M 2200/00* (2013.01); *H01M 2200/20* (2013.01); *H01M 2220/20* (2013.01)

(56) References Cited

U.S. PATENT DOCUMENTS

| | | |
|---|---|---|
| 6,296,965 B1 | 10/2001 | Azema |
| 2015/0079432 A1 | 3/2015 | Okuda et al. |

FOREIGN PATENT DOCUMENTS

| | | |
|---|---|---|
| JP | 2014-002901 A | 1/2014 |
| JP | 2014-017051 A | 1/2014 |
| WO | 2013/154166 A1 | 10/2013 |

OTHER PUBLICATIONS

Written Opinion of the International Searching Authority of PCT/JP2015/054168 dated Apr. 28, 2015.
International Search Report of PCT/JP2015/054168 dated Apr. 28, 2015.
International Preliminary Report on Patentability with translation of Written Opinion dated Oct. 13, 2016, issued by the International Searching Authority in application No. PCT/JP2015/054168.

\* cited by examiner

CURRENT INTERRUPTION DEVICE AND ELECTRICAL ENERGY STORAGE DEVICE USING THE SAME

CROSS REFERENCE TO RELATED APPLICATIONS

This application is a National Stage of International Application No. PCT/JP2015/054168 filed Feb. 16, 2015, claiming priority based on Japanese Patent Application No. 2014-068971 filed Mar. 28, 2014, the contents of all of which are incorporated herein by reference in their entirety.

TECHNICAL FIELD

The present specification discloses a current interruption device and an electrical energy storage device using the current interruption device.

BACKGROUND ART

There has been progress in development of electrical energy storage devices configured to interrupt current flowing between electrode terminals (positive terminal and negative terminal) in case where an electrical energy storage device is overcharged or short-circuiting occurs therein. The current interruption device is disposed between the electrode terminal and a corresponding electrode (between a positive terminal and a positive electrode, or between a negative terminal and a negative electrode). International Publication No. WO 2013/154166 A1 discloses a current interruption device including a first conductive member fixed to a casing, and a second conductive member disposed at a position opposed to the first conductive member. Hereinafter, International Publication No. WO 2013/154166 A1 is referred to as Patent Literature 1. The first conductive member is connected to an electrode terminal, and the second conductive member is connected to an electrode. A first deformable member is disposed between the first conductive member and the second conductive member. A center portion of the first deformable member is configured to be in contact with the second conductive member when pressure in the casing is equal to or less than a predetermined value, and configured to be brought out of contact with the second conductive member when the pressure in the casing exceeds the predetermined value. In Patent Literature 1, further, a second deformable member is disposed on a side opposite to the first deformable member relative to the second conductive member. The second deformable member is provided with a projection. When the pressure in the casing exceeds the predetermined value, the second deformable member is configured to be deformed and the projection is brought into contact with the second conductive member to break the second conductive member. By fracturing the second conductive member, the first deformable member and the second conductive member are brought out of contact with each other. With this, a conduction between the electrode terminal and the electrodes is interrupted.

SUMMARY OF INVENTION

In the current interruption device of Patent Literature 1, the second conductive member is configured to be broken by the impact caused when the projection is brought into contact with the second conductive member. With this, the first deformable member and the second conductive member are brought out of contact with each other. Thus, the second deformable member needs to be reliably deformed when the pressure in the easing exceeds the predetermined value. Further, the projection needs to be reliably brought into contact with the second conductive member when the second deformable member is deformed. In Patent Literature 1, the projection attached to the second deformable member is a component separate from the second deformable member. Thus, during use of the electrical energy storage device, there was a possibility that the projection may be detached from the second deformable member. Alternatively, there was a possibility that, when the projection is fixed to the second deformable member by welding, characteristics of the second deformable member may vary, in that case, there was a possibility that a movement accuracy of the second deformable member may be affected. The present specification provides a current interruption device having a higher reliability.

The current interruption device disclosed herein is configured to interrupt, a conduction between an electrode terminal and an electrode when pressure in a casing of an electrical energy storage device exceeds a predetermined value. The current interruption device includes: a first conductive member; a second conductive member; a first deformable member; and a second deformable member. The first conductive member is fixed to the casing. The second conductive member is disposed at a position opposed to the first conductive member. The first deformable member is disposed between the first conductive member and the second conductive member. An end of the first deformable member is connected to the first conductive member. A first center portion of the first deformable member is configured to be in contact with the second conductive member when the pressure in the casing is equal to or less than the predetermined value, and configured to be brought out of contact with the second conductive member when the pressure in the casing exceeds the predetermined value. The second deformable member is disposed on a side opposite to the first deformable member relative to the second conductive member. A second center portion of the second deformable member is configured to be projecting to a side opposite to the second conductive member when the pressure in the casing is equal to or less than the predetermined value, and configured to move toward the second conductive member when the pressure in the casing exceeds the predetermined value. In the current interruption device disclosed herein, a plastic deformation portion projecting toward the second conductive member is provided on the second center portion of the second deformable member.

In the current interruption device described above, the plastic deformation portion projecting toward the first deformable member is provided on the second center portion of the second deformable member. The projecting portion is formed on the second deformable member through plastic deformation of the second deformable member itself. In other words, the second deformable member itself functions as a projection projecting toward the second conductive member. By forming the plastic deformation portion on the second center portion of the second deformable member, the projection (plastic deformation portion) can be prevented from being detached from the second deformable member. Further, a separate component (projection) may not have to be fixed to the second deformable member, and hence changes in characteristics of the second deformable member can be restricted.

According to the art disclosed herein, a current interruption device having a high reliability can be achieved.

DESCRIPTION OF EMBODIMENTS

Some of technical features of an electrical energy storage device disclosed herein will here be described. Note that, matters described below each independently have technical utility.

An electrical energy storage device comprises a casing, an electrode assembly, an electrode terminal, and a current interruption device. The electrode assembly may be accommodated in a casing, and may include a positive electrode and a negative electrode. The electrode terminal may be disposed across an inside and an outside of the casing. Specifically, a part of the electrode terminal may be located on the outside of the easing, and another part of the electrode terminal may be located on the inside of the casing. The current interruption device may be connected to a negative terminal and the negative electrode. In this case, the current interruption device is disposed on a conductive path between the negative terminal, and the negative electrode, and configured to switch a state of the negative terminal and the negative electrode from a conductive state to a non-conductive state when the internal pressure in the casing exceeds a predetermined value. The current interruption device may be connected to a positive terminal and the positive electrode. In this case, the current interruption device is disposed on a conductive path between the positive terminal and the positive electrode, and configured to switch a state of the positive terminal and the positive electrode from the conductive state to the non-conductive state when the internal pressure in the casing exceeds the predetermined value.

The current interruption device may comprise a first conductive member, a second conductive member, a first deformable member, and a second deformable member. The first conductive member may be fixed to the casing of the electrical energy storage device. The first conductive member may be a part of the positive terminal or a part of the negative terminal.

The second conductive member may be disposed at a position opposed to and spaced from the first conductive member. The second conductive member may be connected to the electrode. A thickness of a center portion of the second conductive member may be smaller than a thickness of an end of the second conductive member. At the center portion of the second conductive member, there may be provided a breakable groove which firstly breaks when the pressure in the casing exceeds the predetermined value. The breakable groove may form a circle which is continuous or intermittent at the center portion of the second conductive member. Note that, the breakable groove may only have to be a fragile portion which firstly breaks when the pressure in the casing exceeds the predetermined value, and may be provided locally at the center portion of the second conductive member.

The first deformable member may be disposed between the first conductive member and the second conductive member. An end of the first deformable member may be connected to the first conductive member. A center portion of the first deformable member may be connected to the second conductive member. When the pressure in the casing is equal to or less than the predetermined value. The center portion of the first deformable member may be fixed to the second conductive member at a position surrounded by the breakable groove. The center portion of the first deformable member may be configured to be brought out of contact with the second conductive member when the pressure in the casing exceeds the predetermined value. The center portion of the second conductive member may break so as to cause the first deformable member to be detached from the second conductive member when the pressure in the casing exceeds the predetermined value. The center portion of the first deformable member may be projecting toward the second conductive member when the first deformable member is connected to the second conductive member, and may be deformed to project toward the first conductive member when the first deformable member is not in contact with the second conductive member.

The second deformable member may be disposed on a side opposite to the first deformable member relative to the second conductive member. In other words, the second conductive member may be provided between the first deformable member and the second deformable member. The second deformable member may be provided between the second conductive member and the electrode assembly. The second deformable member may be fixed to the second conductive member. A center portion of the second deformable member may be configured to be projecting to a side opposite to the second conductive member (in a direction away from the second conductive member) when the pressure in the casing is equal to or less than the predetermined value, and the center portion of the second deformable member may be configured to move toward the second conductive member when the pressure in the casing exceeds the predetermined value. The second deformable member may be made of metal.

The center portion of the second deformable member may comprise a plastic deformation portion projecting toward the second conductive member. That is, the center portion of the second deformable member may comprise a projecting portion where the second deformable member itself is projecting toward the second conductive member. The plastic deformation portion nay be configured to be separated from the second conductive member when the pressure in the casing is equal to or less than the predetermined value, and may be configured to make contact with the second conductive member when the pressure in the casing exceeds the predetermined value. The plastic deformation portion may be opposed to a portion surrounded by the breakable groove of the second conductive member. The plastic deformation portion may be opposed to a portion at which the center portion of the first deformable member and the second conductive member are fixed to each other.

A width of the plastic deformation portion may become smaller in a direction toward a top (portion closer to the second conductive member) of the plastic deformation portion. More specifically, as viewed in a cross-section of the second deformable member, a width of the top may be smaller than a width of another portion of the plastic deformation portion. Alternatively, the width of the top of the plastic deformation portion may be larger than that of the other portion of the plastic deformation portion. In this case, the plastic deformation portion may have a substantially uniform width at a part ranging from a bottom (portion farthest from the second conductive member) to an intermediate portion of the plastic deformation portion, and has a large width locally at the top. Further, the top of the plastic deformation portion may comprise a flat surface. The top of the plastic deformation portion may be opposed to the portion surrounded by the breakable groove of the second conductive member.

An insulating cap may be attached to the plastic deformation portion. The cap may be attached to the plastic deformation portion, with a shape of the cap conforming to a shape of the plastic deformation portion. When the width of the top of the plastic deformation portion is larger than a width of the bottom of the plastic deformation portion, a width of the cap may be smaller on a bottom side of the plastic deformation portion than on a top side of the plastic deformation portion. In this case, the cap may comprise a flange at a position corresponding to another portion than the top of the plastic deformation portion. A material of the cap may be resin or rubber.

Examples of the electrical energy storage device disclosed herein may include a secondary battery and a capacitor. Examples of the electrode assembly of the secondary battery include a stack-type electrode assembly in which a plurality of cells each including a pair of electrodes (a negative electrode and a positive electrode) opposing each other via a separator are stacked, and a wound-type electrode assembly in which a cell sheet including a pair of electrodes opposed to each other via a separator is formed into a spiral shape. Further, the electrical energy storage device disclosed herein can be mounted, for example, to a vehicle, and supply electric power to a motor. Hereinbelow, a structure of the electrical energy storage device will be described. Note that, an electrical energy storage device comprising a current interruption device connected to a negative terminal and a negative electrode will be described. The art disclosed herein is applicable also to an electrical energy storage device comprising a current interruption device connected to a positive terminal and a positive electrode.

First Embodiment

Figure 1:
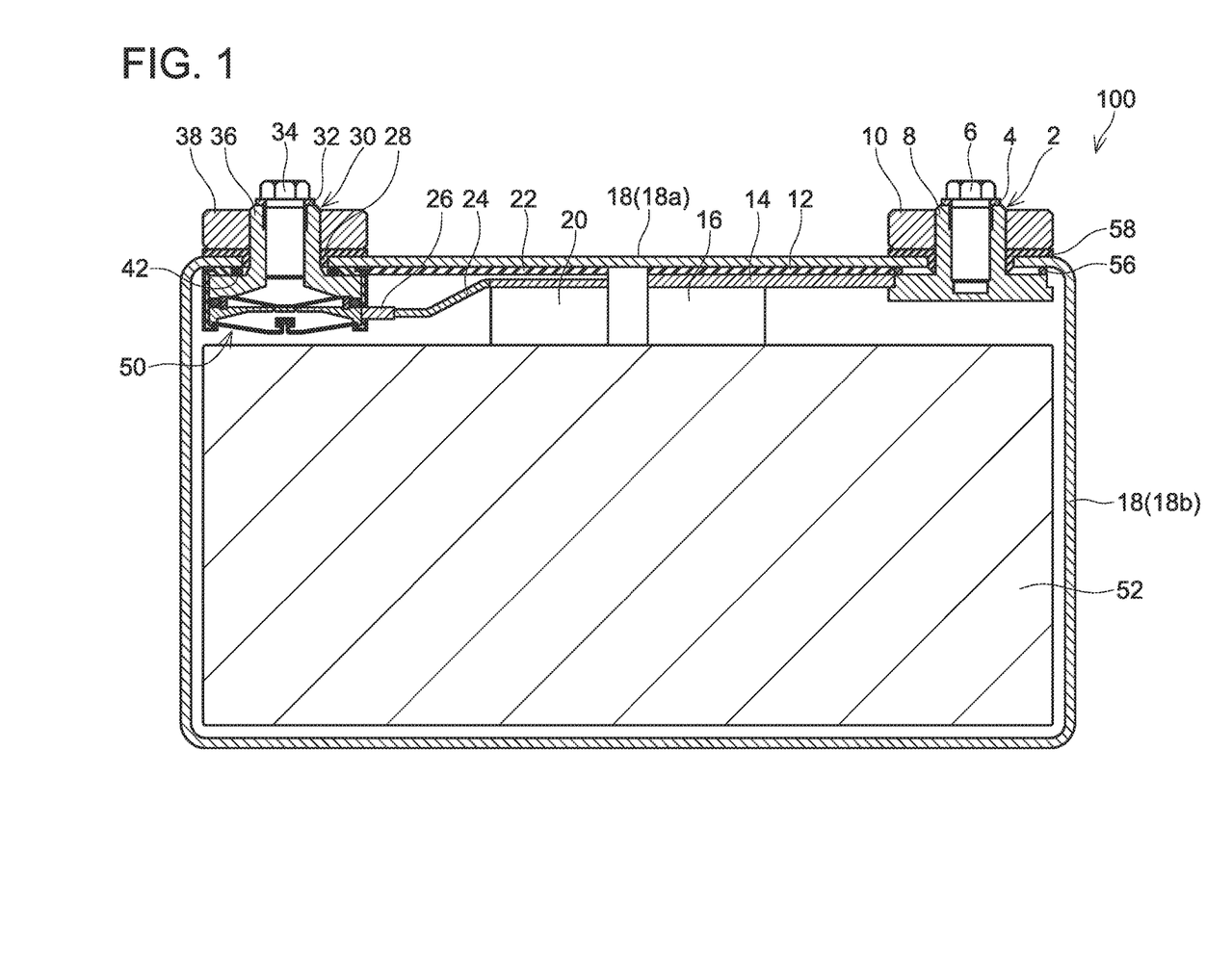
FIG. 1 is a sectional view of an electrical energy storage device according to a first embodiment.

With reference to FIG. 1, a structure of an electrical energy storage device 100 will be described. The electrical energy storage device 100 comprises a casing 18, an electrode assembly 52, a positive terminal 2, a negative terminal 30, and a current interruption device 50. The casing 18 is made of metal, and has a substantially cuboid shape. The casing 18 includes a lid 18a and a body 18b. The electrode assembly 52 and the current interruption device 50 are accommodated in the casing 18. The electrode assembly 52 includes a positive electrode and a negative electrode (not shown). A positive tab 16 is fixed to the positive electrode, and a negative tab 20 is fixed to the negative electrode. The inside of the casing 18 is filled with an electrolyte solution.

The positive terminal 2 and the negative terminal 30 are provided across the inside and an outside of the casing 18. The positive terminal 2 and the negative terminal 30 are disposed along one of directions of the casing 18. That is, both the positive terminal 2 and the negative terminal 30 are disposed on the same direction relative to the electrode assembly 52 (side on which the lid 18a is provided). The positive terminal 2 includes a bolt portion 8. The bolt portion 8 refers to a threaded portion of the positive terminal 2 which is threaded for fastening a nut 10. The positive terminal 2 is fixed to the casing 18 by engaging the nut 10 with the bolt portion 8. The positive terminal 2 has one end located on the outside of the casing 18, and another end located on the inside of the casing 18. Similarly, the negative terminal 30 includes a bolt portion 36. The bolt portion 36 refers to a threaded portion of the negative terminal 30 which is threaded for fastening a nut 38. The negative terminal 30 is fixed to the casing 18 by engaging the nut 38 with the bolt portion 36. The negative terminal 30 has one end located on the outside of the casing 18, and another end located on the inside of the casing 18.

A positive lead 14 is connected to the positive terminal 2. The positive lead 14 is connected to the positive tab 16. The positive terminal 2 is electrically connected to the positive tab 16 via the positive lead 14. That is, the positive terminal 2 is electrically connected to the positive electrode of the electrode assembly 52. The positive lead 14 is insulated from the easing 18 by an insulating sheet 12. The positive terminal 2 and the nut 10 are insulated from the casing 18 by an insulating member 58. In the casing 18, an insulating seal member 56 is disposed between the positive terminal 2 and the casing 18. A gap between the positive terminal 2 and the casing 18 is sealed by the seal member 56. Further, a bus bar 4 is fixed to the positive terminal 2 with a bus-bar bolt 6.

The current interruption device 50 is connected to the negative terminal 30. The current interruption device 50 is connected to a negative lead 24 via a connector 26 made of metal. The current interruption device 50 will be described in detail below. The negative terminal 30 is electrically connected to the negative tab 20 via the negative lead 24. That is, the negative terminal 30 is connected electrically to the negative electrode of the electrode assembly 52. The negative lead 24 is insulated from the casing 18 by an insulating sheet 22. The negative terminal 30 and the nut 38 are insulated from the casing 18 by an insulating member 28. In the casing 18, a seal member 42 having insulation property is disposed between the negative terminal 30 and the casing 18. A gap between the negative terminal 30 and the casing 18 is sealed by the seal member 42. The seal member 42 is an insulating O-ring. Note that, a bus bar 32 is fixed to the negative terminal 30 with a bus-bar bolt 34.

In the electrical energy storage device 100, when pressure in the casing 18 is equal to or less than a predetermined value, the negative terminal 30 and the negative tab 20 are electrically connected to each other via the current interruption device 50. That is, a conduction is established between the negative terminal 30 and the negative electrode. When the pressure in the easing exceeds the predetermined value, the current interruption device 50 interrupts the conduction between the negative terminal 30 and the negative tab 20 such that current is prevented from flowing to the electrical energy storage device 100.

Figure 2:
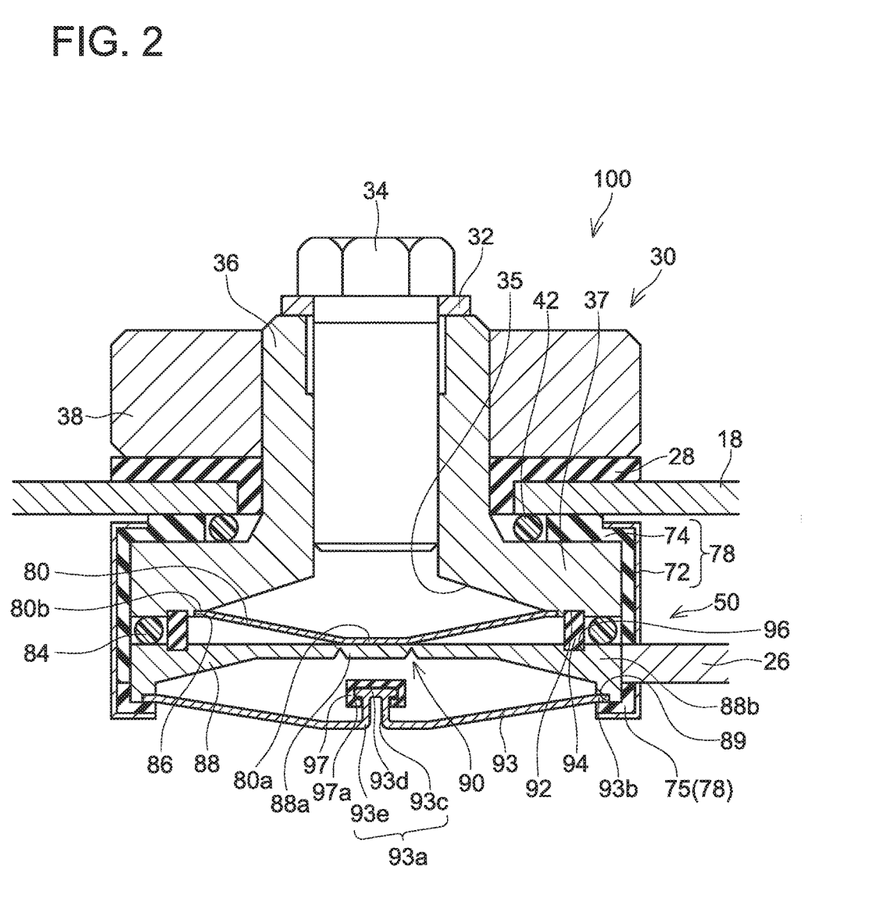
FIG. 2 is an enlarged sectional view of a current interruption device used in the electrical energy storage device according to the first embodiment.

With reference to FIG. 2, the current interruption device 50 will be described. The current interruption device 50 comprises the negative terminal 30, a breakable plate 88, a first deformable member 80, and a second deformable member 93. The negative terminal 30, the breakable plate 88, the first deformable member 80, and the second deformable member 93 are each made of metal. In the easing 18, the negative terminal 30 is provided with an enlarged diameter portion 37. That is, the enlarged diameter portion 37 is a part of the negative terminal 30, and fixed to the casing 18. The enlarged diameter portion 37 (negative terminal 30) is an example of the first conductive member. A groove 92 and a recess 86 each recessed toward the outside of the casing 18 are formed on a breakable plate 88 side of the enlarged diameter portion 37. The recess 86 is provided on an inner side (closer to a central axis of the negative terminal 30)

relative to the groove 92. An opposed surface 35 is formed on an end face of the enlarged diameter portion 37 on the breakable plate 88 side. The opposed surface 35 is opposed to the breakable plate 88, and recessed toward the central axis of the negative terminal 30. Specifically, the opposed surface 35 is inclined from an end toward a center thereof (toward the central axis of the negative terminal 30) so as to be spaced away from the breakable plate 88. Note that, the opposed surface 35 refers to a part of the surface of the large diameter portion 37 which is opposed to the breakable plate 88, and specifically, refers to a part to which the first deformable member 80 is not fixed.

The breakable plate 88 is disposed at a position opposed to and spaced from the enlarged diameter portion 37. The breakable plate 88 is an example of the second conductive member. A groove 96 recessed toward the inside of the casing 18 (side on which the electrode assembly 52 is disposed) is provided (refer also to FIG. 1) on an enlarged diameter portion 37 side of the breakable plate 88. The groove 96 is formed at a position opposed to the groove 92. The connector 26 is fixed to the breakable plate 88. A conduction is established between the breakable plate 88 and the negative tab 20 via the connector 26 and the negative lead 24 (refer also to FIG. 1). A thickness of a center portion 88a of the breakable plate 88 is smaller than a thickness of an end portion 88b. Further, the center portion 88a is provided with a breakable groove 90. The breakable groove 90 tonus a continuous circle at the center portion 88a. A recess 89 is provided on a side of the breakable plate 88 opposite to the enlarged diameter portion 37. The recess 89 is provided at the end portion 88b of the breakable plate 88.

The first deformable member 80 is disposed between the enlarged diameter portion 37 and the breakable plate 88. The first deformable member 80 is a metal diaphragm. An end 80b of the first deformable member 80 is fixed to the enlarged diameter portion 37. More specifically, the end 80b of the first deformable member 80 is welded to the enlarged diameter portion 37 under a state where an outer circumferential rim of the first deformable member 80 is in abutment against a side wall of the recess 86 of the enlarged diameter portion 37. A center portion 80a of the first deformable member 80 is projecting away from the enlarged diameter portion 37. In other words, the first deformable member 80 becomes closer to the breakable plate 88 in a direction from the end 80b toward the center portion 80a. The center portion 80a is an example of a first center portion. The center portion 80a is fixed to the breakable plate 88 on the inner side relative to the breakable groove 90. More specifically, the center portion 80a is welded to the breakable plate 88 within a range surrounded by the breakable groove 90.

The second deformable member 93 is disposed on a side opposite to the first deformable member 80 relative to the breakable plate 88. That is, the breakable plate 88 is disposed between the first deformable member 80 and the second deformable member 93. The second deformable member 93 is a metal diaphragm. An end 93b of the second deformable member 93 is fixed to the breakable plate 88. More specifically, the end 93b of the second deformable member 93 is welded to the breakable plate 88 under a state where an outer circumferential rim of the second deformable member 93 is in abutment against a side wall of the recess 89 of the breakable plate 88.

The second deformable member 93 becomes further away from the breakable plate 88 in a direction from the end 93b toward a center portion 93a. The center portion 93a is an example of a second center portion. An entirety of the second deformable member 93 itself has a shape projecting toward a side away from the breakable plate 88 (side on which the electrode assembly 52 is arranged). A projecting portion 93c projecting toward the breakable plate 88 side is formed in the center portion 93a. More specifically, the projecting portion 93c is formed on the center portion 93a by plastic-deforming the center portion 93a of the second deformable member 93 toward the breakable plate 88. The projecting portion 93e is an example of a plastic deformation portion. That is, a clearance between the second deformable member 93 and the breakable plate 88 increases in a direction from the end 93b toward the center portion 93a. However, at the center portion 93a where the projecting portion 93c is provided, the clearance between the second deformable member 93 and the breakable plate 88 is small. The projecting portion 93c includes a top 93d being an end located on the breakable plate 88 side, and a bottom 93O being an end on a side opposite to the top 93d. The top 93d is flat. In a planar view of the projecting portion 93c, a width of the top 93d is greater than a width of the bottom of the projecting portion 93c. More specifically, in the projecting portion 93c, a width within a range from the bottom 93e to an intermediate portion (portion between the top 93d and the bottom 93e) is substantially uniform, and the width of the top 93d is locally large.

The projecting portion 93c is opposed to the center portion 88a of the breakable plate 88. More specifically, in a planar view of the current interruption device 50, the projecting portion 93c is located within the range surrounded by the breakable groove 90. As described above, the second deformable member 93 projects so as to become farther away from the breakable plate 88 in a direction from the end 93b toward the projecting portion 93c. Thus, the clearance between the projecting portion 93c and the breakable plate 88 is provided.

A cap 97 having insulation property is attached to the projecting portion 93c. A shape of the cap 97 conforms to a shape of the projecting portion 93c. Specifically, the cap 97 conforms to a shape of a region ranging from the top 93d to the intermediate portion (portion between the top 93d and the bottom 93e) of the projecting portion 93c. The cap 97 is provided with a flange 97a. Thus, a width of the cap 97 is large at a portion covering the top 93d, and small at a portion covering a part of the projecting portion 93c that excludes the top 93d. That is, the width of the cap 97 is larger on a top 93d side than on a bottom 93e side of the projecting portion 93c. The flange 97a is located at the intermediate portion of the projecting portion 93c.

Figure 3:
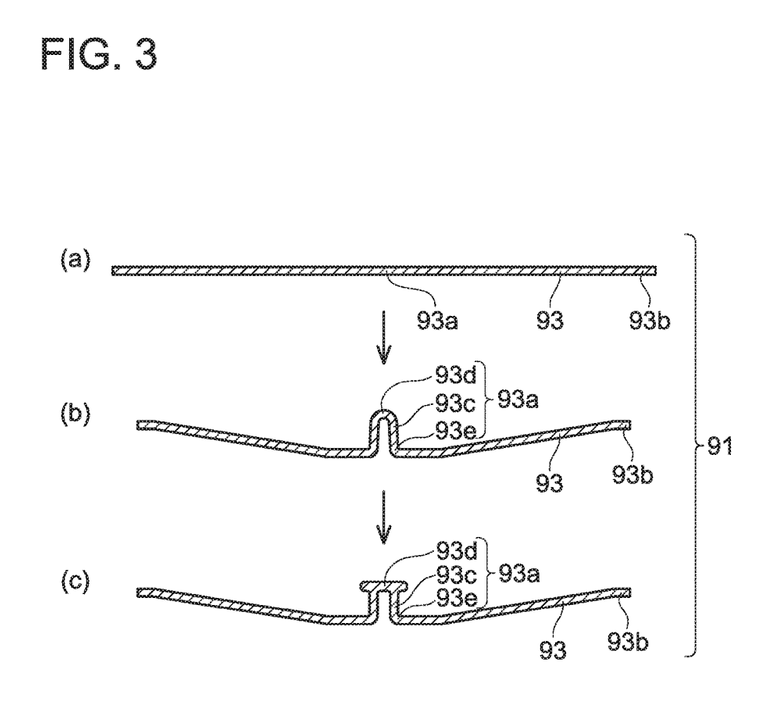
FIG. 3 is a view showing a flow of forming a projecting portion.

Now, with reference to FIG. 3, an example of a method for forming the projecting portion (Plastic deformation portion) 93c in the second deformable member 93 will be described. A flow 91 shows an outline of the method for forming the projecting portion 93c. First, a flat metal plate (second deformable member) 93 shown in (a) is prepared. Next, as shown in (b), the second deformable member 93 is subjected to press working such that the projecting portion 93c is formed on the center portion 93a. At this occasion, the center portion 93a is formed so as to be projecting toward a side opposite to the projecting portion 93c relative to the end 93b. Next, as shown in (c), pressing force is applied to the top 93d of the projecting portion 93c such that the top 93d is flattened. Note that, in (b), the projecting portion 93c may be formed through bending instead of press working.

The description of the current interruption device 50 is continued hereinbelow. As shown in FIG. 2, a support member 78 supports the enlarged diameter portion 37 of the negative terminal 30, and the breakable plate 88. The support member 78 includes an outer portion 72 made of metal, a first inner portion 74 having an insulation property, and a second inner portion 75 having an insulation property. The first inner portion 74 is disposed on the inner side relative to the outer portion 72, and above (on casing 18 side relative to) the second inner portion 75. The second inner portion 75 is disposed on the inner side relative to the outer portion 72, and below (on electrode assembly 52 side relative to) the first inner portion 74. The enlarged diameter portion 37 and the breakable plate 88 are positioned by the outer portion 72. Specifically, after the first inner portion 74 and the second inner portion 75 are set at predetermined positions, the outer portion 72 is crimped to fix the breakable plate 88 to the enlarged diameter portion 37. Note that, the inner portions 74 and 75 insulate the enlarged diameter portion 37 and the breakable plate 88 from each other.

A seal member 84 is disposed between the enlarged diameter portion 37 and the breakable plate 88. The seal member 84 is an O-ring having an insulation property. The seal member 84 insulates the enlarged diameter portion 37 and the breakable plate 88 from each other, and keeps an inside of the current interruption device 50 airtight. That is, the seal member 84 seals the enlarged diameter portion 37 and the breakable plate 88 to shield a space within the current interruption device 50 from a space outside of the current interruption device 50 (space in the casing 18).

An insulating member 94 is disposed between the enlarged diameter portion 37 (negative terminal 30) and the breakable plate 88. The insulating member 94 maintains a clearance between the enlarged diameter portion 37 and the breakable plate 88. That is, the insulating member 94 prevents the enlarged diameter portion 37 and the breakable plate 88 from making contact with each other, thereby preventing a direct conduction therebetween. Both ends of the insulating member 94 are located within the grooves 92 and 96. With this, the insulating member 94 is restricted from moving toward the first deformable member 80 and the seal member 84. Further, since the movement of the insulating member 94 is restricted, even when the seal member 84 attempts to move to a first deformable member 80 side, the seal member 84 comes into contact with the insulating member 94, which inhibits the seal member 84 from moving any further inward.

When the internal pressure in the easing 18 is equal to or less than the predetermined value, the negative terminal 30 and the negative electrode are in conduction with each other via the first deformable member 80, the breakable plate 88, the connector 26, the negative lead 24, and the negative tab 20. When the internal pressure in the casing 18 is equal to or less than the predetermined value, a clearance between the cap 97 and the breakable plate 88 is present.

For example, when the electrical energy storage device 100 is overcharged, there may be a case where the internal pressure in the casing 18 increases to exceed the predetermined value. When the internal pressure in the casing 18 exceeds the predetermined value, a pressure difference is generated between the inside and the outside of the current interruption device 50. As a result, the second deformable member 93 is deformed toward the breakable plate 88. That is, the center portion 93a is moved toward the center portion 88a of the breakable plate 88. In other words, the second deformable member 93 is inverted, with the end 93b being a support point thereof. With this, the projecting portion 93c is brought into contact with the breakable plate 88, and the breakable plate 88 is broken as the breakable groove 90 is broken first. The projecting portion 93c is brought into indirect contact with the breakable plate 88 via the cap 97.

The first deformable member 80 and the breakable plate 88 are separated from each other, and the breakable plate 88 and the first deformable member 80 are brought out of conduction. Since the negative terminal 30 and the negative electrode are brought out of conduction, current can be prevented from flowing between the positive terminal 2 and the negative terminal 30 (refer also to FIG. 1).

Further, the breaking of the breakable plate 88 causes the center portion 80a of the first deformable member 80 to move from the breakable plate 88 side toward the enlarged diameter portion 37 side. In other words, the first deformable member 80 is inverted. Note that, as described above, since the opposed surface 35 of the enlarged diameter portion 37 is recessed, the inversion of the first deformable member 80 is not hindered by the enlarged diameter portion 37 (negative terminal 30). After the breaking of the breakable plate 88, the conduction between the first deformable member 80 and the breakable plate 88 can be prevented from being reestablished. That is, after the current interruption device 50 is actuated by the increase in pressure in the casing 18, a current is not allowed to re-flow between the positive terminal 2 and the negative terminal 30.

Further, when the second deformable member 93 is inverted, a part of the projecting portion 93c comes to a position above the breakable plate 88. In other words, the projecting portion 93c penetrates the center portion 88a of the breakable plate 88. The projecting portion 93c restricts the first deformable member 80 from moving downward (to the breakable plate 88 side). With this, the conduction between the first damnable member 80 and the breakable plate 88 can be more reliably prevented from being reestablished.

There may be a case where, after the second deformable member 93 is inverted, the first deformable member 80 and the projecting portion 93c continue to be in contact with each other, or the first deformable member 80 continues to be in contact via the center portion 88a of the breakable plate 88 with the projecting portion 93c. Even in such cases, since the insulating cap 97 covers the projecting portion 93c, the conduction between the first deformable member 80 and the breakable plate 88 can be more reliably prevented from being reestablished.

Advantageous points of the electrical energy storage device 100 will be described. The projecting portion 93c is formed through the plastic deformation of the second deformable member 93 itself. That is, the projecting portion 93c is a part of the second deformable member 93. Since unlike conventional current interruption devices, a projection being a component separate from the second deformable member may not have to be fixed to the second deformable member, the projecting portion 93c is not detached from the second deformable member 93. Further, changes in the characteristics of the second deformable member 93 can be restricted. When the pressure in the casing 18 exceeds the predetermined value, the second deformable member 93 can be reliably deformed to break the breakable plate 88.

Another advantageous points of the electrical energy storage device 100 will be described. The width of the top 93d of the projecting portion 93c is greater than the width of the bottom of the same. Because the flange 97a of the cap 97 catches the top 93d, and hence the cap 97 is not liable to be detached from the projecting portion 93c. Further, as described above, the top 93d of the projecting portion 93c is flat. With this, an area in which the projecting portion. 93c is in contact with the breakable plate 88 is increased, and therefore the breakable plate 88 can be reliably broken.

Further, in the configuration described above in this embodiment, the width of the top 93d of the projecting portion 93c is locally larger than those of other portions of the projecting portion 93c. However, the art disclosed herein is applicable also to a configuration in which the width of the top is not locally large. The projecting portion provided on the second deformable member may only have to be formed through the plastic deformation of the second deformable member itself. For example, the width of the projecting portion may become smaller in a direction from the bottom toward the top.

In addition, when the width of the top 93d of the projecting portion 93c is locally larger than those of the other portions, the shape of the cap may not have to conform to the shape of the projecting portion 93c. As long as the flange of the cap has a shape that is caught by the top 93d, a position at which the flange is provided can be arbitrarily changed. For example, the flange may not have to be provided at the intermediate portion of the projecting portion, and may be provided at the bottom of the projecting portion 93c. The cap may only have to have as shape that is fitted to the projecting portion, and the flange may not have to be provided.

Still further, in the configuration described above in this embodiment, the current interruption device is connected to the negative lead via the connector. However, the connector and the negative lead may be provided as a single component. That is, the current interruption device may be connected directly to a member (negative lead) that is connected to the negative tab. Further, when the current interruption device is disposed between the positive terminal and the positive electrode, the current interruption device may be connected directly to a member (positive lead) that is connected to the positive tab.

As described above, in the electrical energy storage device, the projecting portion provided on the second deformable member may only have to be formed through the plastic deformation of the second deformable member itself. Thus, various materials can be used as those of the components of the current interruption device, and those of the components of the electrical energy storage device. Hereinbelow, as to a lithium-ion secondary battery, which is an example of the electrical energy storage device, materials of the components of the electrical enemy storage device are exemplified.

The electrode assembly will be described. The electrode assembly includes a positive electrode, a negative electrode, and a separator interposed at a position between the positive electrode and the negative electrode. The positive electrode includes a positive-electrode metal foil, and a positive-electrode active material layer arranged on the positive-electrode metal foil. The positive tab corresponds to a part of the positive-electrode metal foil to which the positive-electrode active material layer is not applied. The negative electrode includes a negative-electrode metal foil, and a negative-electrode active material layer arranged on the negative-electrode metal foil. The negative tab corresponds to a part of the negative-electrode metal foil to which the negative-electrode active material layer is not applied. Note that, materials contained in the active material layer (active material, binder, conductive additive, and the like) are not particularly limited, and materials of electrodes of, for example, publicly-known electrical energy storage devices may be used.

As the positive-electrode metal foil, aluminum (Al), nickel (Ni), titanium (Ti), stainless steel, or composite materials thereof may be used. In particular, it is preferred to use aluminum or composite materials containing aluminum.

Further, as materials of the positive lead, the same materials as those usable for the positive-electrode metal foil may be used.

The positive-electrode active material may only have to be a material which lithium ions can be adsorbed into and desorbed from, and for example, $Li_2MnO_3$, $Li(NiCoMn)_{0.33}O_2$, $Li(NiMn)_{0.5}O_2$, $LiMn_2O_4$, $LiMnO_2$, $LiNiO_2$, $LiCoO_2$, $LiNi_{0.8}Co_{0.15}Al_{0.05}O_2$, $Li_2MnO_2$, and $LiMn_2O_4$ may be used. Further, as the positive-electrode active material, for example, alkali metals such as lithium and sodium, or sulfur may be used. Those materials may be used alone or in combination with each other. The positive-electrode active material is applied as appropriate to the positive-electrode metal foil together with, for example, a conductive agent and a binder.

As the negative-electrode metal foil, for example, aluminum (Al), nickel (Ni), copper (Cu), or composite materials thereof may be used. In particular, it is preferred to use copper or composite materials containing copper. Further, as materials of the negative lead, the same materials as those usable for the negative-electrode metal foil may be used.

As the negative-electrode active material, materials that lithium ions can be absorbed into and desorbed from are used. Specifically, alkali metals such as lithium (Li) and sodium (Na), transition metal oxides containing alkali metals, carbon materials such as natural graphite, mesocarbon microbeads, highly-oriented graphite, hard carbon, and soft carbon, and elemental silicon, silicon-containing alloys, or silicon-containing oxides may be used. Note that, in order to increase a battery capacity, it is particularly preferred that the negative-electrode active material not contain lithium (Li). The negative-electrode active material is applied as appropriate to the negative-electrode metal foil together with, for example, a conductive agent and a hinder.

As the separator, porous bodies having an insulation property is used. Specifically, porous films made of polyolefin-based resins such as polyethylene (PE) and polypropylene (PP), or a woven fabric sheet or a nonwoven fabric sheet made, for example, of polypropylene, polyethylene terephthalate (PET), or methyl cellulose may be used.

It is preferred that the electrolyte solution be a non-aqueous electrolyte solution obtained through dissolution of supporting salt (electrolyte) into a non-aqueous solvent. As the non-aqueous solvent, solvents containing chain esters such as ethylene carbonate (EC), propylene carbonate (PC), dimethyl carbonate (DMC), diethyl carbonate (DEC), and ethyl methyl carbonate (EMC), solvents such as ethyl acetate and methyl propionate, or mixtures thereof may be used. Further, as the supporting salt (electrolyte), for example, $LiPF_6$, $LiBF_4$, and $LiAsF_6$ may be used.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. A current interruption device configured to interrupt a conduction between an electrode terminal and an electrode when pressure in a casing of an electrical energy storage device exceeds a predetermined value, the current interruption device comprising:
- a first conductive member fixed to the casing;
- a second conductive member disposed at a position opposed to the first conductive member;
- a first deformable member disposed between the first conductive member and the second conductive member, an end of the first deformable member being connected to the first conductive member, a first center portion of the first deformable member being configured to be in contact with the second conductive member when the pressure in the casing is equal to or less than the predetermined value and configured to be brought out of contact with the second conductive member when the pressure in the casing exceeds the predetermined value; and
- a second deformable member disposed on a side opposite to the first deformable member relative to the second conductive member, a second center portion of the second deformable member being configured to be projecting to a side opposite to the second conductive member when the pressure in the casing is equal to or less than the predetermined value, and configured to move toward the second conductive member when the pressure in the casing exceeds the predetermined value, wherein
- a plastic deformation portion formed by plastic deformation of the second deformable member and projecting toward the second conductive member; the plastic deformation portion being provided on the second center portion of the second deformable member;
- the plastic deformation portion comprising a projecting part, which projects from the second deformation portion toward the second conductive member, and a top part disposed on top of the projecting part;
- wherein a width of the top part of the plastic deformation portion is greater than a width of any portion of the projecting part of the plastic deformation portion.

2. The current interruption device according to claim 1, wherein
- an insulating cap is attached to the plastic deformation portion, and
- the insulating cap comprises a flange at a position corresponding to the other portion of the plastic deformation portion.

3. The current interruption device according to claim 2, wherein the top of the plastic deformation portion comprises a flat surface.

4. An electrical energy storage device comprising:
the current interruption device according to claim 3.

5. The electrical energy storage device according to claim 4, wherein the electrical energy storage device is a secondary battery.

6. The current interruption device according to claim 1, wherein the top part of the plastic deformation portion comprises a flat surface.

7. An electrical energy storage device comprising:
the current interruption device according to claim 1.

8. The electrical energy storage device according to claim 7, wherein the electrical energy storage device is a secondary battery.

9. A current interruption device configured to interrupt a conduction between an electrode terminal and an electrode when pressure in a casing of an electrical energy storage device exceeds a predetermined value, the current interruption device comprising:
- a first conductive member fixed to the casing;
- a second conductive member disposed at a position opposed to the first conductive member;
- a first deformable member disposed between the first conductive member and the second conductive member, an end of the first deformable member being connected to the first conductive member, a first center portion of the first deformable member being configured to be in contact with the second conductive member when the pressure in the casing is equal to or less than the predetermined value and configured to be brought out of contact with the second conductive member when the pressure in the casing exceeds the predetermined value; and
- a second deformable member disposed on a side opposite to the first deformable member relative to the second conductive member, a second center portion of the second deformable member being configured to be projecting to a side opposite to the second conductive member when the pressure in the casing is equal to or less than the predetermined value, and configured to move toward the second conductive member when the pressure in the casing exceeds the predetermined value, wherein
- a plastic deformation portion formed by plastic deformation of the second deformable member and projecting toward the second conductive member is provided on the second center portion of the second deformable member;
- the second conductive member comprises a breakable groove, and
- a top of the plastic deformation portion opposes a portion of the second conductive member surrounded by the breakable groove.

* * * * *